United States Patent [19]

Harrison

[11] 3,994,504

[45] Nov. 30, 1976

[54] SAFETY RETAINER FOR IMPACT TOOL DEVICE

[75] Inventor: Robert S. Harrison, Angelton, Tex.

[73] Assignee: The Dow Chemical Company, Midland, Mich.

[22] Filed: Oct. 6, 1975

[21] Appl. No.: 619,737

[52] U.S. Cl. .......... 279/19.6
[51] Int. Cl.[2] .......... B23B 34/04
[58] Field of Search .......... 279/19.7, 19.6, 19

[56] References Cited

UNITED STATES PATENTS 1,882,520 10/1932 Pollard .......... 279/19.6

*Primary Examiner*—Gil Weidenfeld
*Attorney, Agent, or Firm*—Earl D. Ayers

[57] ABSTRACT

An upper sleeve retainer for use on pneumatically driven rivet cutting devices or the like wherein a cutting chisel fits into an upper sleeve in the barrel of the device and is impacted by a driven piston. The retainer includes a sleeve which is quickly detachably secured to the outer end of the barrel and has an inwardly extending flange which extends in front of and prevents the upper sleeve from leaving the barrel. Because the outer diameter of the piston is larger than the inner diameter of the upper sleeve, both the piston and upper sleeve remain in the barrel if the device is triggered.

4 Claims, 3 Drawing Figures

SAFETY RETAINER FOR IMPACT TOOL DEVICE

BACKGROUND OF THE INVENTION

This invention relates to pneumatic impact tool devices and particularly to heavy duty pneumatically driven chisels. In such devices, which commonly strike about 900 blows per minute, the forward-motion of the chisel is damped by a rubber sleeve which is impacted by the shoulder of a so-called lower sleeve, made of metal, which fits over the chisel and seats against the tapered outer surface of the chisel. A retainer sleeve fits over and is secured to the barrel end of the chisel device and surrounds the lower sleeve and the rubber impact absorbing sleeve member. The impact absorbing member fits against the inwardly extending flanged end of the retainer sleeve. The flanged end fits closely but loosely around the outer surface of the lower sleeve.

A chisel is removed from the impact chiseling device by removing the retainer sleeve and then withdrawing the chisel. Once the retainer sleeve is removed, accidental triggering of the device would drive the piston and upper sleeve of the device out of the barrel as projectiles. These "projectiles" can and have caused serious injuries to anyone or anything in their path.

OBJECTS OF THE INVENTION

Accordingly, a principal object of this invention is to provide improved, safer to use impact driven chisel devices. Another object of this invention is to provide an improved, safe and easy to assemble and disassemble impact driven chisel device.

STATEMENT OF INVENTION

In accordance with this invention, there is provided an impact chisel device in a retainer cap fits over the barrel end of the device and under the retainer sleeve to hold the piston and upper sleeve in position in the barrel in event the device is accidentally triggered as the chisel (tool) of the device is being changed. The chisel or tool extends through a bore in the end of the retainer cap.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 1:
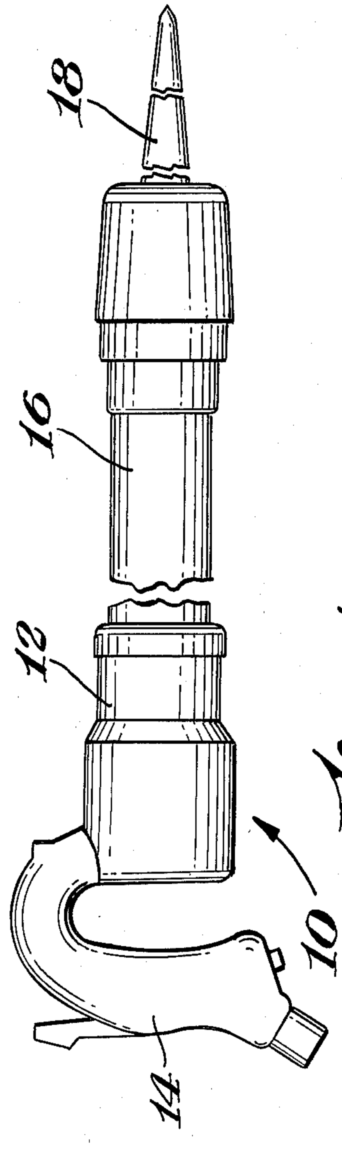
FIG. 1 is a side elevational view of an impact tool device in accordance with this invention.

Referring to FIG. 1, there is shown an impact driven tool device 10 including a body part 12, handle 14, barrel 16 and tool 18.

Figure 3:
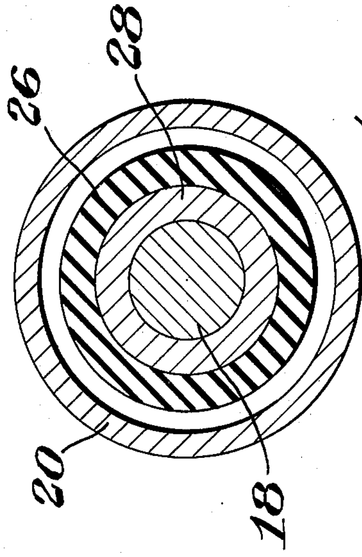
FIG. 3 is a sectional view taken along the line 3—3 of FIG. 2.
Figure 2:
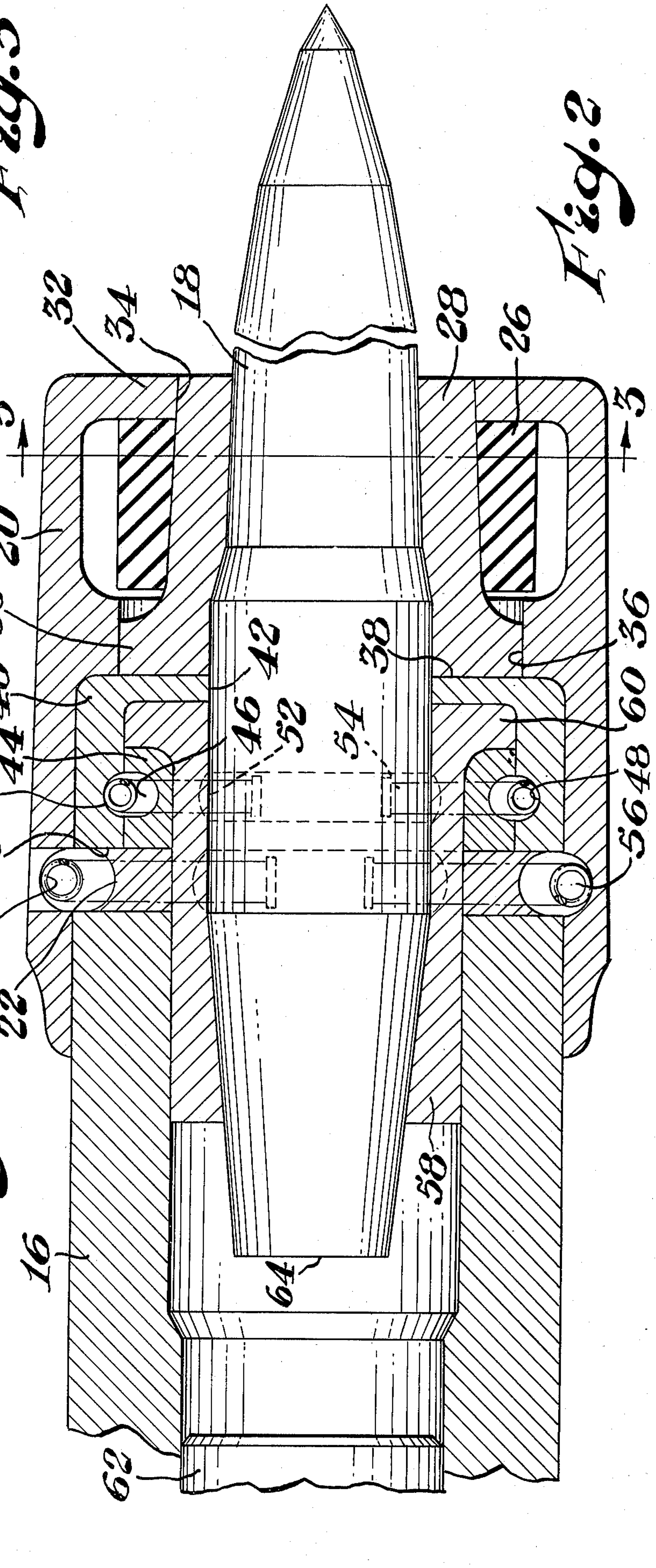
FIG. 2 is a fragmentary view, partly in section showing the retainer cap of the invention in place over the barrel end.

Referring now to FIGS. 2 and 3, there is shown the barrel 16 with the conventional retainer sleeve 20, fitted over the barrel and secured thereto by spring means in the grooves 22, 24, the elastomeric impact receiving sleeve 26, and lower sleeve 28 disposed within the retainer sleeve 20. The elastomeric sleeve 26 is disposed over the sleeve 28 with the outwardly extending flanged part 30 at the rear end of the lower sleeve 28 at one end thereof and the inwardly extending flange 32 of the retainer sleeve being disposed at the other end thereof. The edge 34 of the flange 32 fits closely but slidably around the outer surface of the lower sleeve 28.

The rear flanged end 30 of the lower sleeve is adapted to slide back and forth along the inner surface part 36 of the retainer sleeve 20 as the device 10 is operated. Although the rear end of the lower sleeve 28 is shown in contact with the forward end 38 of the retainer cap 40, the rear end part 30 of the lower sleeve 28 may move between the forward end 38 of the retainer cap 40 and the limit of compression of the elastomeric sleeve 26 against which the sleeve 28 bears in its most forward position.

The retainer cap 40 has an axial bore 42 extending therethrough whose diameter permits the tool 18 (usually a chisel) to pass through it.

The end part 44 of the barrel 16 is of reduced diameter from just beyond the groove 22 used to secure the retainer sleeve 20 to the barrel. The reduced diameter part 44 has a circumferentially extending groove 46 disposed about midway between the barrel end and the larger diameter part of the barrel 16.

The retainer cap 40 fits closely but slidably over the reduced diameter part of the barrel 16, with the outer configuration fitting slidably within the inner configuration of the retainer sleeve 20.

The inner surface of the tubular part of the retainer cap 40 has a circumferentially extending groove 48 disposed so that when the end 50 of the retainer cup abuts against the larger diameter part of the barrel 16, the grooves 46 and 48 are aligned with respect to each other. A slot 52 extending through the tubular wall of the retainer cap 40 provides access to the coupling spring 54. A similar slot provides access to the spring 56 in grooves 22, 24 which secures the retainer sleeve 20 to the gun barrel 16.

An upper sleeve member 58 extends slidably within the barrel from the outer end thereof and has an outwardly extending flanged part 60 which fits in the space between the barrel end part 44 and the forward end 38 of the retainer cap 40.

The inner diameter of the upper sleeve member 58 is such that the tool (chisel) 18 seats against the inner wall surface of the member 58 when the tool 18 is in its rearmost position.

The piston 62 is adapted to move back and forth in the barrel 16 as is well-known, striking the rear end 64 of the tool 18, which rear end 64 extends rearwardly beyond the rear part of the upper sleeve member 58. ;

OPERATION

In operation, the tool is driven by triggering the impact device 10, causing the piston to drive forward against the end 64 of the tool 18.

Because the lower sleeve 28 is wedged and seated against the tapered outer surface of the tool 18, the lower sleeve 28 is driven through the bore 34 in the retainer sleeve 20 until the flanged part 30 of the sleeve 28 compresses the elastomeric sleeve 26 to the maximum extent. The lower sleeve 28 and the tool 18 then return rearwardly until the next impact by the piston 62. The upper sleeve member, abutting or almost abutting against the end 38 of the retainer cap, undergoes little or no motion when the tool 18 is driven forward.

When it is desired to change tools 18 or replace the elastomeric sleeve 26, the retainer sleeve is removed by manipulating the spring in the grooves 24, 26 to permit the retainer sleeve 20 to slide off the end of the barrel 16.

The tool 18, lower sleeve 28 and the elastomeric sleeve 26 will then slide out of the barrel.

In event the device is accidentally triggered, the forward end of the piston 62 will strike the rear of the upper retainer member 58, but neither the piston 62 nor the upper retainer member 58 can move forward because the retainer cap 40 is positioned in front of the flanged end 60 of the upper sleeve member 58.

The retainer cap 40 is made of a suitable alloy such as 4140 or 4340 low alloy steel.

The retainer cap of this invention is operable on a number of brands of heavy duty "guns," such as "90" Series guns, for example.

The invention provides simple, rugged means to prevent the accidents which formerly occurred once the retainer sleeve was removed and the gun was triggered.

What is claimed is:

1. In a tool impact device having a tool retaining portion at one end, said tool retaining portion including a barrel, an upper sleeve received in said barrel for supporting and guiding an impact tool, a retainer sleeve extending beyond said barrel and releasably secured thereto, a flanged lower sleeve slidably received within said retainer sleeve and having a tool receiving bore, said bore having abutment portions to engage said tool, whereby the lower sleeve will move with the tool upon impact thereof, an elastomeric member disposed between the flange of the lower sleeve and a lip on said retainer sleeve to absorb impact therebetween, the improvement comprising a reduced diameter portion on said barrel adjacent the retainer sleeve, a metal tubular retainer cap secured on the reduced diameter portion of said barrel, the end of said cap being disposed between the upper and lower sleeves and having a bore thereat to allow the tool to pass therethrough, whereby when the retainer sleeve is removed the upper sleeve remains secured within the barrel by the retainer cap.

2. A tool device in accordance with claim 1, wherein said upper sleeve has an outwardly extending flanged end part which is disposed between said reduce diameter part of said barrel and said retainer cap.

3. A tool device in accordance with claim 1, wherein the outer diameter of said retainer cap is no greater than the maximum diameter of said barrel over which retainer sleeve fits.

4. A tool device in accordance with claim 1, wherein said retainer cap is quickly detachably coupled to said barrel.

* * * * *

UNITED STATES PATENT AND TRADEMARK OFFICE

CERTIFICATE OF CORRECTION

PATENT NO. : 3,994,504

DATED : November 30, 1976

INVENTOR(S) : Robert S. Harrison

It is certified that error appears in the above-identified patent and that said Letters Patent are hereby corrected as shown below:

In column 2, line 33, delete "cup" and insert --cap--.

In column 2, line 53, delete the semicolon ";" at the end of the line.

In column 3, line 21, insert quotation marks around the word gun --"gun"--.

In column 4, line 19, Claim 2, delete "reduce" and insert --reduced--.

Signed and Sealed this

Fifteenth Day of March 1977

[SEAL]

*Attest:*

RUTH C. MASON
*Attesting Officer*

C. MARSHALL DANN
*Commissioner of Patents and Trademarks*